US012465022B2

(12) United States Patent
Liu

(10) Patent No.: US 12,465,022 B2
(45) Date of Patent: Nov. 11, 2025

(54) PET HARNESS INCLUDING LEG LIMITERS HAVING A RETRACTABLE BINDING ROPE

(71) Applicant: Beijing Chongzhiyu Technology Co., Ltd., Beijing (CN)

(72) Inventor: Xingchen Liu, Beijing (CN)

(73) Assignee: Beijing Chongzhiyu Technology Co., Ltd., Beijing (CN)

( * ) Notice: Subject to any disclaimer, the term of this patent is extended or adjusted under 35 U.S.C. 154(b) by 0 days.

(21) Appl. No.: 18/760,326

(22) Filed: Jul. 1, 2024

(65) Prior Publication Data

US 2025/0064022 A1 Feb. 27, 2025

(30) Foreign Application Priority Data

Aug. 23, 2023 (CN) .......................... 202322276900.6

(51) Int. Cl.
*A01K 15/04* (2006.01)
*A01K 27/00* (2006.01)

(52) U.S. Cl.
CPC ............ *A01K 15/04* (2013.01); *A01K 27/002* (2013.01)

(58) Field of Classification Search
CPC ....... A01K 15/02; A01K 15/04; A01K 27/002
USPC .......................................................... 119/818
See application file for complete search history.

(56) References Cited

U.S. PATENT DOCUMENTS

| | | | |
|---|---|---|---|
| RE32,547 E * | 11/1987 | Reed ...................... | A01K 15/02 119/818 |
| 6,354,247 B1 * | 3/2002 | Andrews ................ | A01K 15/02 119/818 |
| 7,963,256 B1 * | 6/2011 | Horgan ................. | A01K 27/002 119/816 |
| 11,140,871 B2 * | 10/2021 | Kamath ................ | A01K 27/005 |
| 2005/0087149 A1 * | 4/2005 | Hodl ...................... | A01K 15/04 119/818 |
| 2014/0116354 A1 * | 5/2014 | Harris, II ............. | A47D 13/086 119/796 |
| 2015/0031007 A1 * | 1/2015 | Ruiz ...................... | A63B 69/18 434/253 |
| 2015/0257363 A1 * | 9/2015 | Eldevik ................ | A01K 15/021 119/720 |
| 2020/0281163 A1 * | 9/2020 | Hetzer .................. | A01K 27/009 |
| 2022/0104929 A1 * | 4/2022 | Cummins .............. | G16H 40/63 |
| 2022/0142125 A1 * | 5/2022 | Betzer ................... | A01K 27/004 |

* cited by examiner

*Primary Examiner* — Brady W Frazier
(74) *Attorney, Agent, or Firm* — Westbridge IP LLC

(57) ABSTRACT

Disclosed is a pet harness. The pet harness includes a harness body, a leg limiter, a driving device and a binding rope. The harness body includes a shoulder strap portion and a waistband portion. The leg limiter is annular and is sleeved on legs of the pet. The driving device is provided on the shoulder strap portion. One end of the binding rope is connected to the leg limiter, and the other end of the binding rope is connected to the driving device along an extension direction of the waistband portion. The driving device is configured to retract the binding rope to lead the leg limiter for restricting a pet movement, or to lengthen the binding rope to release the leg limiter for allowing the pet to move freely.

7 Claims, 2 Drawing Sheets

PET HARNESS INCLUDING LEG LIMITERS HAVING A RETRACTABLE BINDING ROPE

CROSS-REFERENCE TO RELATED APPLICATIONS

The present application claims priority to Chinese Patent Application No. 202322276900.6, filed on Aug. 23, 2023, the entire contents of which are incorporated herein by reference.

TECHNICAL FIELD

The present application relates to the technical field of pet supplies, and in particular, to a pet harness.

BACKGROUND

In the existing related technology, pet harnesses are usually equipped with a lead, and users can use the lead to pull the pet to limit the pet's activities and prevent the pet from rushing around. However, since the pet is agile and fast, the lead used to control the pet's movement will exert a greater traction force on the user when the pet rushes around, which can easily cause the pet to drag the user with the lead, and the control effect on the pet's behavior is not good.

SUMMARY

The main purpose of the present application is to provide a pet harness, which aims to control the pet's behavior by regulating the motion range of its legs, thereby enhancing the effectiveness of behavior management.

In order to achieve the above purpose, the present application provides a pet harness including a harness body, a leg limiter, a driving device and a binding rope.

The harness body includes a shoulder strap portion and a waistband portion. The shoulder strap portion is configured to be worn on a back of a pet, and two ends of the waistband portion are respectively connected to left and right sides of the shoulder strap portion to restrain a waist of the pet and to fix the harness body to a trunk of the pet.

The leg limiter is annular and is sleeved on legs of the pet.

The driving device is provided on the shoulder strap portion.

One end of the binding rope is connected to the leg limiter, and the other end of the binding rope is connected to the driving device along an extension direction of the waistband portion. The driving device is configured to retract the binding rope to lead the leg limiter for restricting a pet movement, or to lengthen the binding rope to release the leg limiter for allowing the pet to move freely.

In some embodiments, the driving device includes a housing and a driving mechanism.

The housing is provided on the shoulder strap portion. A receiving cavity is formed in the housing, and an outer wall of the housing is provided with an avoidance opening communicated with the receiving cavity.

The driving mechanism is provided in the receiving cavity. The binding rope extends toward the receiving cavity through the avoidance opening and is in a transmission connection with the driving mechanism. The driving mechanism is configured to retract the binding rope into the receiving cavity, or to extend the binding rope towards an outside the receiving cavity.

In some embodiments, the driving mechanism includes a motor provided in the receiving cavity and a rolling member sleeved on an output shaft of the motor and configured to rotate forward or reverse under the drive of the motor. An end of the binding rope away from the leg limiter is wound on the rolling member.

In response to that the rolling member rotates forward, the binding rope is wound on the rolling member to retract toward the receiving cavity; and in response to that the rolling member rotates reverse, the binding rope is unwound on the rolling member to extend toward the outside of the receiving cavity.

In some embodiments, the rolling member is provided with an axial hole, and the output shaft passes through the axial hole.

A hole wall of the axial hole is provided with a limiting protrusion, and an circumference of the output shaft is provided with a limiting recess. The limiting protrusion and the limiting recess are plug-fitted.

In some embodiments, the pet harness further includes a tension sensor configured to detect a tension of the binding rope, and/or a detection device configured to detect a movement state of the pet.

In some embodiments, two leg limiters are respectively provided on a left front limb and a right front limb of the pet, or respectively provided on a left hind limb and a right hind limb of the pet.

Two binding ropes are provided, and each of the two binding ropes corresponds to one leg limiter.

In some embodiments, the harness body further includes a chest strap portion. The chest strap portion and the waist strap portion are provided in sequence along a front-to-back direction of the shoulder strap portion, and two ends of the chest strap portion are respectively connected to the left and right sides of the shoulder strap portion to restrain a chest of the pet.

In some embodiments, the two ends of the chest strap portion are detachably connected to the shoulder strap portion respectively; and/or a connecting structure is provided on a side of the chest strap portion facing the waist strap portion. The connecting structure protrudes toward the waist strap portion and is detachably connected to the waist strap portion.

In some embodiments, the pet harness further includes a lead provided on the shoulder strap portion.

In some embodiments, the shoulder strap portion is provided with a storage structure, and an inner cavity is formed in the storage structure. A through hole communicated with the inner cavity is provided on an outer wall of the storage structure.

One end of the lead is accommodated in the storage structure, and the other end of the lead is retractably provided in the through hole.

At least a part of the storage structure is provided with an elastic buffer structure, or the storage structure is made of an elastic material.

According to the technical solution of the present application, the pet harness has a harness body that is worn on the pet's trunk. A driving device is provided on the harness body. The pet harness also includes leg limiters that are restrained on the legs of the pet, and a binding rope is connected between the leg limiters and the driving device. With such arrangement, when the pet behaves abnormally, such as wantonly colliding, the driving device can retract the binding rope and tighten the leg limiters, thereby limiting the movement of the pet by limiting the movement range of the pet's legs, and enhancing the effectiveness of behavior management.

BRIEF DESCRIPTION OF THE DRAWINGS

In order to more clearly illustrate the technical solutions in the embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

Figure 1:
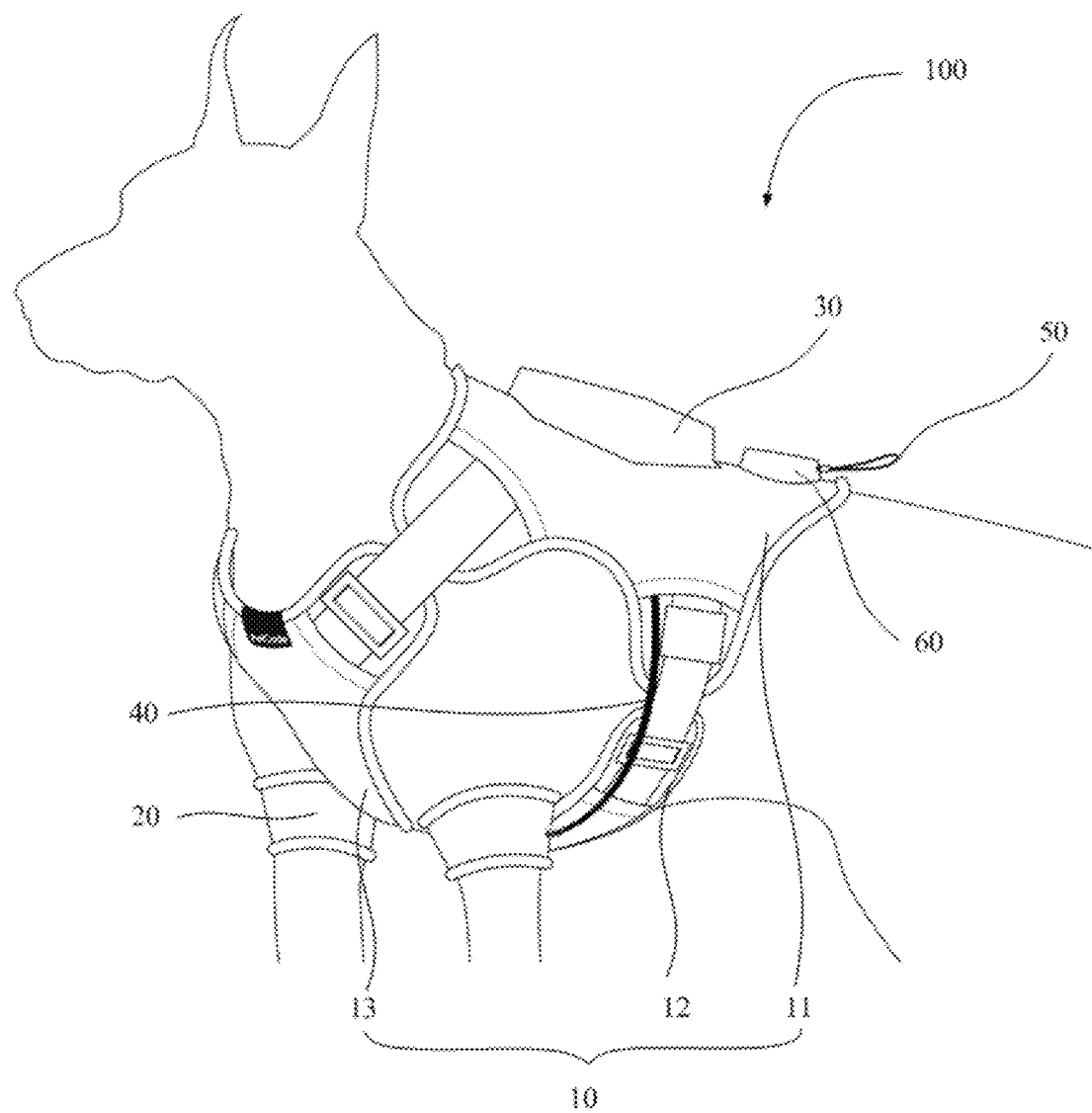
FIG. 1 is a schematic structural view of a pet harness according to some embodiments of the present application.

The realization of the purpose, functional characteristics and advantages of the present application will be further described with reference to the accompanying drawings in combination with embodiments.

DETAILED DESCRIPTION OF THE EMBODIMENTS

The technical solutions of the embodiments of the present application will be clearly and completely described below in conjunction with the accompanying drawings of the embodiments of the present application. It is obvious that the embodiments to be described are only some rather than all the embodiments of the present application. All other embodiments obtained by those skilled in the art based on the embodiments of the present application without creative efforts should fall within the scope of the present application.

It should be noted that all the directional indications (such as up, down, left, right, front, rear, etc.) in the embodiments of the present application are only used to explain the relative positional relationship, movement, or the like of the components in a certain posture (as shown in the drawings). If the specific posture changes, the directional indication will change accordingly.

In the present application, unless otherwise definitely specified and limited, terms such as "connect" and "fix" should be understood in a broad sense. For example, "connect" may be a fixed connection, a detachable connection or integrated as a whole; may be a mechanical connection or an electrical connection; may be directly connected or indirectly connected via an intermediate medium; may also be a internal communication between two components or the interactional relation between two components. For those skilled in the art, the specific meaning of the above-mentioned terms in the present application can be understood according to specific situations.

Besides, the descriptions associated with, "first" and "second", etc. in the present application are merely for descriptive purposes, and cannot be understood as indicating or suggesting relative importance or implicitly indicating the number of the indicated technical feature. Therefore, the feature associated with "first" or "second" can expressly or implicitly include at least one such feature. Moreover, the technical solutions of various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present application.

The present application provides a pet harness 100.

As shown in FIG. 1, in some embodiments of the present application, the pet harness 100 includes a harness body 10, a leg limiter 20, a driving device 30, and a binding rope 40.

The harness body 10 includes a shoulder strap portion 11 and a waistband portion 12, the shoulder strap portion 11 is used to be worn on the back of the pet, and the two ends of the waistband portion 12 are respectively connected to the left and right sides of the shoulder strap portion 11 for restraining the waist of the pet, so that the harness body 10 is fixed to the pet's trunk.

The leg limiter 20 is annular and is sleeved on the pet's legs.

The driving device 30 is provided on the shoulder strap portion 11.

One end of the binding rope 40 is connected to the leg limiter 20, the other end is connected to the driving device 30 along the extension direction of the waistband portion 12. The driving device 30 is used to retract the binding rope 40 and pull the leg limiter 20 to restrict the movement of the pet, or to lengthen the binding rope 40 and release the leg limiter 20 to allow the pet to move freely.

In some embodiments, the pet harness 100 includes a harness body 10, a leg limiter 20, a driving device 30 and a binding rope 40. The harness body 10 includes a shoulder strap portion 11 and a waistband portion 12 connected to each other. The shoulder strap portion 11 is used to be worn on the back of the pet and can be used as an installation base for the driving device 30. The two ends of the waistband portion 12 are respectively connected to the left and right sides of the shoulder strap portion 11, and are used to bind the waist of the pet.

In some embodiments, the waistband portion 12 may be a belt structure, and the length of the belt structure may be adjusted, so that the harness body 10 may be tightened or loosened by adjusting the size of the waistband portion 12. In this way, the harness body 10 may be better fitted and restrained to the pet's trunk. The technical solution of the present application is not limited thereto, and the shoulder strap portion 11 and the waistband portion 12 may also be connected by a belt structure with an adjustable length, so that the harness body 10 may be tightened or loosened by adjusting the length of the belt structure. In this way, the harness body 10 may be better fitted and restrained to the pet's trunk.

In some embodiments, the pet harness 100 also includes a driving device 30, a leg limiter 20 and a binding rope 40. The leg limiter 20 is annular and is used to bind the legs of the pet. The driving device 30 is provided at a shoulder strap portion 11 of the harness body 10, and is connected to the leg limiter 20 through the binding rope 40. The binding rope 40 can be retracted or extended to control the extended length of the binding rope 40.

It should be noted that in the related art, the pet harness 100 is usually provided with a lead 50, and the user can pull the pet through the lead 50 to limit the pet's activities and prevent the pet from colliding at will. However, when controlling the pet's movement through the lead 50, due to the pet's agility and high speed, it will generate a large traction force on the user when colliding at will, which may easily cause the pet to drag the user through the lead 50, and the control effect of the pet's behavior is not good.

The harness body 10 of the pet harness 100 is worn on the pet's trunk, and the harness body 10 is provided with a driving device 30. The pet harness 100 also includes a leg limiter 20, the leg limiter 20 is bound to the pet's legs, and a binding rope 40 is connected between the leg limiter 20 and the driving device 30. In this way, when the pet behaves abnormally, such as wantonly colliding, the driving device 30 can retract the binding rope 40 and tighten the leg limiter 20, thereby limiting the pet's movement by limiting the activity range of the pet's legs, thereby improving the control effect on the pet's behavior.

Figure 2:
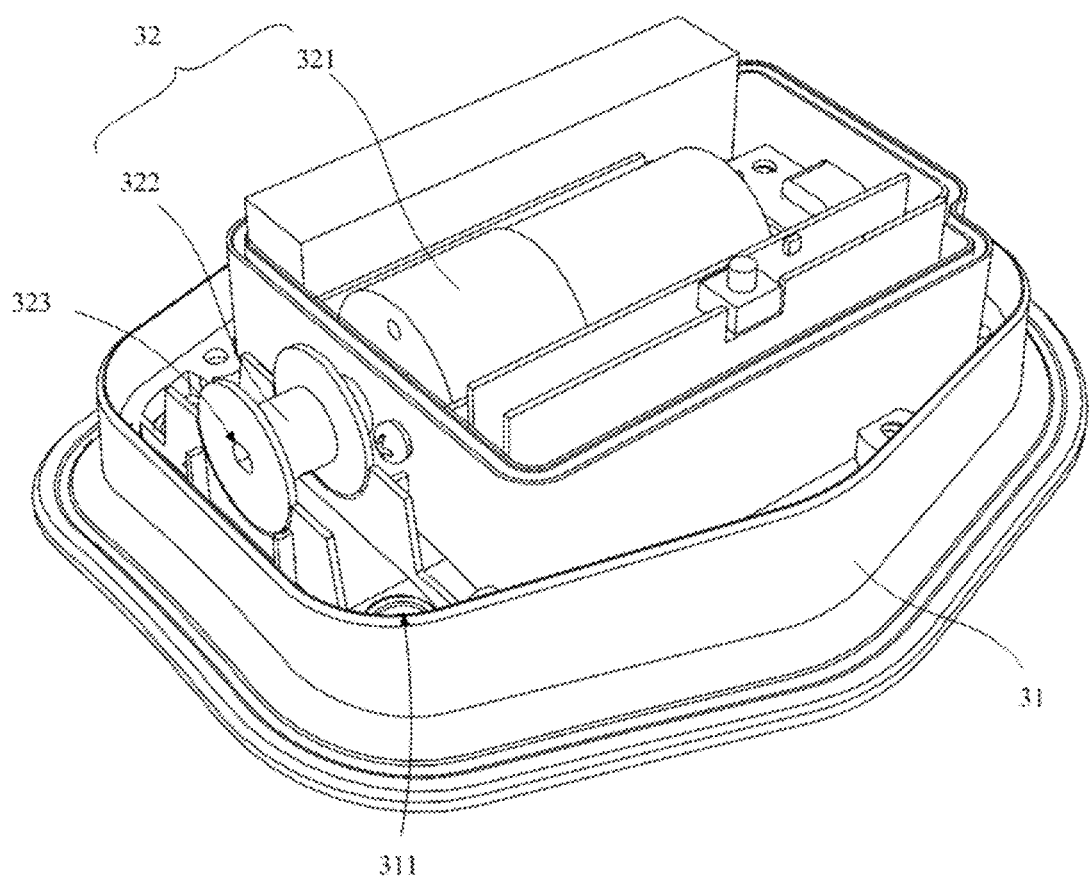
FIG. 2 is a schematic structural view of a driving device of the pet harness in FIG. 1.

As shown in FIG. 2, in some embodiments of the present application, the driving device 30 includes a housing 31 and a driving mechanism 32.

The housing 31 is provided at the shoulder strap portion 11, a receiving cavity is formed in the housing 31, and an avoidance opening 311 communicated with the receiving cavity is further provided on the outer wall of the housing 31.

The driving mechanism 32 is provided in the receiving cavity, the binding rope 40 extends toward the receiving cavity through the avoidance opening 311, and is transmission-connected to the driving mechanism 32. The driving mechanism 32 is used to retract the binding rope 40 into the receiving cavity, or to extend the binding rope 40 out of the receiving cavity.

In these embodiments, the driving device 30 further includes a housing 31 and a driving mechanism 32. The housing 31 is provided at the shoulder strap portion 11. A receiving cavity is formed in the housing 31 for receiving the driving mechanism 32. The outer wall of the housing 31 is also provided with an avoidance opening 311 communicated with the receiving cavity, so that the binding rope 40 can extend toward the receiving cavity through the avoidance opening 311 and be connected to the driving mechanism 32 by transmission.

The driving mechanism 32 may be a linear motion mechanism that can move toward or away from the avoidance opening 311, and is used to pull the end of the binding rope 40 away from or close to the avoidance opening 311, thereby controlling the length of the binding rope 40. The driving mechanism 32 may also be a rotary motion mechanism that is used to control the length of the binding rope 40 by winding and unwinding the binding rope 40. The specific implementation method can be set according to actual needs and is not limited here.

As shown in FIG. 2, in some embodiments of the present application, the driving mechanism 32 includes a motor 321 and a rolling member 322

The motor 321 is provided in the receiving cavity.

The rolling member 322 is sleeved on the output shaft of the motor 321, and is used to rotate forward or reverse under the drive of the motor 321. The end of the binding rope 40 away from the leg limiter 20 is wound on the rolling member 322.

When the rolling member 322 rotates forward, the rolling member 322 rolls up the binding rope 40 to retract the binding rope 40 toward the receiving cavity, and when the rolling member 322 rotate reverse, the rolling member 322 unwinds the binding rope 40 to extend the binding rope 40 toward the outside of the receiving cavity.

In these embodiments, the driving mechanism 32 includes a motor 321, the motor 321 has an output shaft, and a rolling member 322 is sleeved on the outer side of the output shaft. The rolling member 322 is connected to the output shaft of the motor 321 by transmission, and the end of the binding rope 40 away from the leg limiter 20 is wound on the circumference of the rolling member 322. In this way, the rolling member 322 can rotate forward synchronously with the output shaft to roll up the binding rope 40, and can also rotate backward synchronously with the output shaft to unwind the binding rope 40, thereby controlling the length of the binding rope 40. Furthermore, the pulling force of the binding rope 40 can be changed by adjusting the rotation speed of the motor 321 to limit the movement speed and range of the pet.

As shown in FIG. 2, in some embodiments of the present application, the rolling member 322 is provided with an axial hole 323, and the output shaft is passed through the axial hole 323.

The hole wall of the axial hole 323 is provided with a limiting protrusion, and the circumference of the output shaft is provided with a limiting recess, and the limiting protrusion and the limiting recess are matched.

In these embodiments, the rolling member 322 is formed with an axial hole 323, and the axial hole 323 can penetrate through the rolling member 322, or can be set as a blind hole in the direction of the output shaft of the motor 321. The output shaft is passed through the axial hole 323. The hole wall of the axial hole 323 is provided with a limiting protrusion, and the circumference of the output shaft is provided with a limiting recess, and the limiting protrusion and the limiting recess are matched, so that the inner contour of the axial hole 323 and the outer contour of the output shaft can be engaged, so that the output shaft can be well matched with the axial hole 323, and the transmission accuracy between the motor 321 and the driving member is improved.

In some embodiments of the present application, the pet harness 100 also includes a tension sensor, which is used to detect the tension of the binding rope 40.

In these embodiments, the pet harness 100 also includes a tension sensor, which is used to detect the tension of the binding rope 40, so as to control and adjust the tension of the binding rope 40 on the leg limiter 20, and further to reduce the risk of excessive tension causing damage to the pet's limbs, thereby improving the safety of the pet harness 100.

In some embodiments of the present application, the pet harness 100 further includes a detection device, which is used to detect the movement state of the pet.

In these embodiments, the pet harness 100 further includes a detection device, which can be set as a distance sensor to detect the distance between the pet and the user by measuring the propagation time of the signal, further to detect whether the pet is normally accompanying the user or whether the pet is active in the target area. The detection device can also be set as a position sensor, which is used to detect the current position of the pet, so as to detect whether the pet is active in the target area. The detection device can also be set as a speed sensor, which is used to detect the movement speed of the pet in real time, so as to detect whether the pet has a burst behavior. The technical solution of the present application is not limited to this, and the detection device can also be set as other devices that can detect the movement state of the pet. By setting the detection device, the movement state of the pet can be obtained in time, so that the driving device 30 can make corresponding adjustments, so as to restrain and guide the pet's behavior in time.

As shown in FIG. 1, in some embodiments of the present application, two leg limiters 20 are provided. The two leg limiters 20 are respectively provided on the left front limb and the right front limb of the pet, or respectively provided on the left hind limb and the right hind limb of the pet.

Two binding ropes 40 are provided. Each binding rope 40 corresponds to one leg limiter 20.

In these embodiments, two leg limiters 20 are provided. The two leg limiters 20 can be respectively provided on the left front limb and the right front limb of the pet, or respectively provided on the left hind limb and the right hind limb of the pet. In this way, the motion range of the pet's front limb or hind limb can be controlled, and the control effect on the pet's behavior can be ensured.

As shown in FIG. 1, in some embodiments of the present application, the harness body 10 also includes a chest strap portion 13, the chest strap portion 13 and the waistband portion 12 are sequentially provided along the front-to-back direction of the shoulder strap portion 11 of the harness, and the two ends of the chest strap portion 13 are respectively connected to the left and right sides of the shoulder strap portion 11 of the harness for restraining the pet's chest.

In these embodiments, the harness body 10 also includes a chest strap portion 13, which is provided in the shape of the pet's chest contour, and is provided in sequence with the waistband portion 12 along the front-to-back direction of the pet's trunk. The two ends of the chest strap portion 13 are respectively connected to the shoulder strap portion 11 of the harness. By setting the chest strap portion 13, the pet's chest is restrained, which can improve the fixing effect of the harness body 10, so that the harness body 10 can be stably fixed on the pet's front body, and further reduce the risk of the harness body 10 falling off or shifting.

As shown in FIG. 1, in some embodiments of the present application, the two ends of the chest strap portion 13 are detachably connected to the shoulder strap portion 11 of the harness.

In these embodiments, the two ends of the chest strap portion 13 are detachably connected to the shoulder strap portion 11, so that the chest strap portion 13 can be easily put on and taken off, and the chest strap portion 13 can be replaced separately when the chest strap portion 13 is damaged, which is conducive to reducing the maintenance cost of the pet harness 100.

As shown in FIG. 1, in some embodiments of the present application, the chest strap portion 13 is provided with a connecting structure on one side of the chest strap portion 13 facing the waistband portion 12. The connecting structure protrudes toward the waistband portion 12 and is detachably connected to the waistband portion 12.

In these embodiments, a connecting structure is provided on one side of the chest strap portion 13 facing the waistband portion 12. The connecting structure protrudes from the chest strap portion 13 toward the waistband portion 12, and is detachably connected to the waistband portion 12. In this way, the chest strap portion 13, the shoulder strap portion 11, and the waistband portion 12 can be combined into an integral structure to improve the structural stability and fixing effect of the harness body 10.

As shown in FIG. 1, in some embodiments of the present application, the pet harness 100 further includes a lead 50, which is provided at the shoulder strap portion 11.

In these embodiments, the pet harness 100 further includes a lead 50, which is disposed at the shoulder strap portion 11. The lead 50 can be but is not limited to an elastic member. The lead 50 may be detachably connected to the shoulder strap portion 11, so that the lead 50 can be disassembled when it is idle. In some embodiments, the lead 50 can also be retractable. When the user uses the lead 50, the free end of the lead 50 can be extended to a certain length, so that the user can hold the lead 50 and control the pet's behavior through the lead 50. When the lead 50 is idle, it can be shortened to be accommodated in the shoulder strap portion 11, so that the convenience of using the lead 50 can be improved.

Further, the pet harness 100 can have a traveling mode and a wireless fence mode. The pet harness 100 can switch to a corresponding functional mode by detecting the use status of the lead 50. For example, when the user uses the lead 50, the pet harness 100 can automatically switch to the accompanying mode, which is used to limit the pet's movement when the pet is away from the user, that is to say, the binding rope 40 is retracted by the driving device 30 to control the motion range of the pet's limbs, so that the pet can be guided to move around the user, and the effect of the pet accompanying the user is achieved. At this time, the lead 50 can also play a role in assisting the pet's behavior by pulling the pet, so as to better guide the pet's accompanying behavior. When the lead 50 is idle, the pet harness 100 can automatically switch to the wireless fence mode, which is used to limit the pet's movement when the pet leaves the preset range, that is to say, when the pet approaches the edge of the dangerous area or walks away from the edge of the safe area, the binding rope 40 is retracted by the driving device 30 to control the motion range of the pet's limbs, so that the pet can be restricted from further approaching the edge of the dangerous area or leaving the edge of the safe area, so as to restrict the pet's activities within the preset range.

In some embodiments, the pet harness 100 further includes a detection device for the lead 50, which can detect the tension or the released length of the lead 50, so as to determine whether the pet has rushing behaviors by detecting the change in the tension or length of the lead 50, so as to guide and control the pet's behavior in time through the driving device 30.

As shown in FIG. 1, in some embodiments of the present application, the shoulder strap portion 11 is provided with a storage structure 60, an inner cavity is formed in the storage structure 60, and a through hole communicated with the inner cavity is also provided on the outer wall of the storage structure 60. One end of the lead 50 is accommodated in the storage structure 60, and the other end is retractably provided in the through hole.

At least a part of the storage structure 60 is provided with an elastic buffer structure, or the storage structure 60 is made of an elastic material.

In these embodiments, the shoulder strap portion 11 is further provided with a storage structure 60. The storage structure 60 is a hollow shell structure, so that an inner cavity for accommodating the lead 50 is formed therein. The outer wall of the storage structure 60 is also provided with a through hole communicated with the inner cavity. The free end of the lead 50 is retractably provided at the through hole, so that the lead 50 can be easily retracted when the lead 50 is idle, thereby improving the convenience of using the lead 50. The storage structure 60 can be provided on the outer wall of the shoulder strap portion 11, or it can be embedded in the shoulder strap portion 11, to make the through hole exposed to the outside. The specific implementation method can be set according to actual needs.

Furthermore, at least a part of the storage structure 60 is provided with an elastic buffer structure, which may be, but is not limited to, a spring, a buffer, etc. Thus, when the storage structure 60 is impacted, the elastic buffer structure can absorb and disperse energy to reduce the impact or vibration on the storage structure 60. Similarly, in some embodiments, the storage structure 60 may also be made of an elastic material, such as TPU, etc., so that when it is impacted or vibrated externally, it can absorb and reduce the impact or vibration energy through its own elastic deformation. Such a configuration is conducive to reducing the risk of collision damage to the storage structure 60 and extending the service life of the storage mechanism.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. A pet harness, comprising:
    a harness body comprising a shoulder strap portion and a waistband portion, wherein the shoulder strap portion is configured to be worn on a back of a pet, and two ends of the waistband portion are respectively connected to left and right sides of the shoulder strap portion to restrain a waist of the pet and to fix the harness body to a trunk of the pet;
    a leg limiter being annular and being configured to be sleeved on a leg of the pet;
    a driving device provided on the shoulder strap portion; and
    a binding rope, one end of the binding rope being connected to the leg limiter, and the other end of the binding rope being connected to the driving device along an extension direction of the waistband portion, wherein the driving device is configured to retract the binding rope to tighten the leg limiter for restricting a pet movement, or to lengthen the binding rope to release the leg limiter for allowing the pet to move freely;
    the pet harness further comprises a lead provided on the shoulder strap portion; wherein the shoulder strap portion is provided with a storage structure, and an inner cavity is formed in the storage structure; a through hole communicated with the inner cavity is provided on an outer wall of the storage structure;
    one end of the lead is accommodated in the storage structure, and the other end of the lead is retractably provided in the through hole; and
    at least a part of the storage structure is provided with an elastic buffer structure, or the storage structure is made of an elastic material.

2. The pet harness of claim 1, wherein the driving device comprises:
    a housing provided on the shoulder strap portion, wherein a receiving cavity is formed in the housing, and an outer wall of the housing is provided with an avoidance opening communicated with the receiving cavity; and
    a driving mechanism provided in the receiving cavity, the binding rope extending toward the receiving cavity through the avoidance opening and being in a transmission connection with the driving mechanism, wherein the driving mechanism is configured to retract the binding rope into the receiving cavity, or to extend the binding rope towards an outside of the receiving cavity.

3. The pet harness of claim 2, wherein the driving mechanism comprises:
    a motor provided in the receiving cavity; and
    a rolling member sleeved on an output shaft of the motor and configured to rotate forward or reverse under the drive of the motor, wherein an end of the binding rope away from the leg limiter is wound on the rolling member;
    wherein in response to the rolling member rotating forward, the binding rope is wound on the rolling member to retract toward the receiving cavity; and in response to the rolling member rotating reverse, the binding rope is unwound on the rolling member to extend toward the outside of the receiving cavity.

4. The pet harness of claim 3, wherein the rolling member is provided with an axial hole, the output shaft passes through the axial hole;
    a hole wall of the axial hole is provided with a limiting protrusion, and a circumference of the output shaft is provided with a limiting recess; the limiting protrusion and the limiting recess are plug-fitted.

5. The pet harness of claim 1, wherein the pet harness comprises two leg limiters, the two leg limiters are respectively configured to be provided on a left front limb and a right front limb of the pet, or respectively configured to be provided on a left hind limb and a right hind limb of the pet; and
    the pet harness comprises two binding ropes, the two binding ropes are configured to be provided, each of the two binding ropes corresponds to one leg limiter.

6. The pet harness of claim 1, wherein the harness body further comprises a chest strap portion, the chest strap portion and the waist strap portion are provided in sequence along a front-to-back direction of the shoulder strap portion, and two ends of the chest strap portion are respectively connected to the left and right sides of the shoulder strap portion to restrain a chest of the pet.

7. The pet harness of claim 6, wherein the two ends of the chest strap portion are detachably connected to the shoulder strap portion respectively.

\* \* \* \* \*